United States Patent

Popper

[15] 3,684,799

[45] Aug. 15, 1972

[54] ANDROSTENO-2',5'-DIMETHYL-5'-ALKYL-1'-PYRROLINES, METHODS FOR THEIR MANUFACTURE, AND NOVEL 16 ALPHA-(1'-AMINO-1'-ALKYLETHYL)-PREGNENE INTERMEDIATES PRODUCED THEREBY

[72] Inventor: Thomas L. Popper, 152A Linn Drive, Verona, N.J. 07044

[22] Filed: Feb. 18, 1971

[21] Appl. No.: 116,663

[52] U.S. Cl. ............260/239.5, 204/158, 260/397.3, 260/397.4, 260/999
[51] Int. Cl............................................C07c 173/10
[58] Field of Search ......./Machine Searched Steroids

[56] References Cited

UNITED STATES PATENTS

| | | | |
|---|---|---|---|
| 2,740,781 | 4/1956 | Mueller | 260/239.5 |
| 2,750,380 | 6/1956 | Dodson et al | 260/239.5 |
| 3,183,252 | 5/1965 | Crabbe | 260/397.4 |
| 3,196,149 | 7/1965 | Weiss et al | 260/239.5 |

*Primary Examiner*—Henry A. French
*Attorney*—Stephen B. Coan and Mary S. King

[57] ABSTRACT

Androsteno-[17α,16α-c]-2',5'-dimethyl-5'-alkyl-1'-pyrrolines, active as mild stimulants, are prepared by reacting a 16-dehydropregnen-20-one with a disubstituted methylamine in the presence of light followed by treatment of the resulting 16α-(1'-amino-1'-alkylethyl)-pregnen-20-one (which per se exhibit pharmacological activity) with a secondary or tertiary amine in a lower alkanoic acid.

18 Claims, No Drawings

3,684,799

ANDROSTENO-2',5'-DIMETHYL-5'-ALKYL-1'-PYRROLINES, METHODS FOR THEIR MANUFACTURE, AND NOVEL 16α(1'-AMINO-1'-ALKYLETHYL)-PREGNENE INTERMEDIATES PRODUCED THEREBY

FIELD OF INVENTION

This invention relates to novel compositions-of-matter, to methods for their manufacture, and to novel intermediates produced thereby.

More specifically, this invention relates to novel androsteno-[17α,16α-c]-2',5'-dimethyl-5'-alkyl-1'-pyrrolines which are mild stimulants, to methods for their manufacture, and to novel 16α-(1'-amino-1'-alkylethyl)-pregnene intermediates produced thereby which also exhibit pharmacological properties per se, having antibacterial, hypotensive, and anti-inflammatory activities.

DESCRIPTION OF PRIOR ART

Known in the art is a method of preparing 3-keton-4-androsten-[17α, 16α-c]-1'-pyrroline and 3β-hydroxy-5-androsteno-[17α, 16α-c]-1'-pyrroline, said compounds being unsubstituted at the 5'-carbon adjacent the nitrogen atom of the pyrroline ring. The last step of the prior art process involves the treatment of 16α-aminomethylprogresterone (i.e. 16α-aminomethyl-4-pregnene-3,20-dione) or 16α-aminomethyl-pregnenolone 3-acetate (i.e. 16α-aminomethyl-5-pregnen-3β-ol-20-one 3-acetate) with a strong base, i.e. potassium t-butoxide, to obtain the corresponding [17α, 16α-c]-1'-pyrroline.

In this known process, the 16α-aminomethyl-pregnene intermediates are prepared from the corresponding 16-dehydropregnenes (i.e. 16-dehydroprogesterone and 16-dehydropregnenolone) by a multi-step syntheses (4 steps in the case of the pregnenolone, 5 steps in the case of the progesterone) whereby nitromethane under basic conditions is first added to 16-dehydropregnenolone 3-acetate via a Michael reaction, followed by ketalization of the 20-keto group of the 16α-nitromethyl-5-pregnen-3β-ol-20-one 3-acetate thereby formed. The resulting 16α-nitromethyl-20-ethylenedioxy-5-pregnen-3β-ol-20-one 3-acetate upon reduction followed by hydrolysis of the 20-ketal function yields the required 16α-aminomethyl-5-pregnen-3β-ol-20-one (i.e. 16α-aminomethylpregnenolone) intermediate. When the 3-keto-4dehydropregnane intermediate is desired, the aforementioned 16α-aminomethylpregnenolone is oxidized to obtain 16α-aminomethylprogesterone. Alternatively, the 3β-hydroxy-5-dehydro system in the 16α-nitromethylpregnenolone intermediate can be oxidized to the 3-keto-4-dehydro system to form 16α-nitromethylprogesterone which can be ketalized to the 3,20-bis-ethylenedixoy-16α-nitromethyl-4-pregnene followed by reduction and hydrolysis to obtain 16α-aminomethylprogesterone intermediate.

By the process of this invention, it is possible to prepare novel, pharmacologically active androsteno-[17α, 16α-c]-2', 5'-dimethyl-5'-alkyl-1'-pyrrolines (which cannot be prepared from the aforementioned prior art products) from the corresponding 3-keto-4,16-bis-dehydro- and 3β-acetoxy-5,16-bis-dehydropregnanes in only two reaction steps. By my process a 16-dehydropregnane (e.g. 3β-acetoxy-5,16-pregnadien-20-one) upon treatment with a disubstituted methylamine (e.g. isopropylamine) in the presence of of light in the wave length range of from about 2,200 Å to about 3,500 Å surprisingly yields a 16α-(1'-amino-1'-alkylethyl)-pregnane (e.g. 16α-(1'-amino-1'-methylethyl)-5-pregnen-3β-ol-20-one 3-acetate) which upon mild treatment with a secondary or tertiary amine in a lower alkanoic acid (e.g. pyridine and acetic acid) yields an androsteno-[17α, 16α-c]-2', 5'-dimethyl-5'-alkyl-1'-pyrroline heretofore unknown in the art and having pharmacological activity.

In the first step of my process, addition of a primary alkyl amine (e.g. isopropylamine or sec.-butylamine) to the double bond at C-16 yields a 16α-aminoalkyl derivative which is attached to the steroid nucleus through a carbon-carbon bond, e.g. to yield a 16α-amino-isopropyl derivative (also named 16α-(1'-amino-1'-methyl-ethyl) ) or a 16α-amino-sec.-butyl derivative (also named 16α-(1'-amino-1'-ethylethyl) ), respectively. This is surprising since it is known that reaction of a 16-pregnene with primary amines such as isopropylamine or sec.-butylamine, for example, results in addition through a nitrogen-carbon bond producing 16-alkylamino derivatives such as 16α-isopropylamino or 16α-sec.-butylamino-pregnenes, respectively.

It is also surprising that in the second step of my process it is possible to effect ring closure of the hindered 16α-(1'-amino-1'-alkylethyl)-pregnene derivative under such mild conditions in view of prior art methods which require strong base.

Additionally, from the teaching in the art, it is apparent that the novel androsteno-[17α,16α-c]-2',5'-dimethyl-5'-alkyl-1'-pyrrolines of this invention could not be prepared from the prior art 5'-unsubstituted pyrrolines because selective alkylation at the 5'-carbon could not be accomplished; rather, there would occur prior alkylation at C–21 and/or C—17 with ring cleavage.

Thus, by my invention, a novel process produces a novel class of compounds having pharmacological activity.

SUMMARY OF THE INVENTION

The invention sought to be patented in a composition-of-matter aspect resides in the concept of a chemical compound having mild stimulant activity which has a molecular structure comprising an androsteno-[17α,16α-c]-2', 5'-dimethyl-1'-pyrroline nucleus with a double bond stemming from C—5 and an oxygen function at C—3 of the androstene portion thereof and also having a second alkyl substituent at C—5' of the pyrroline ring selected from the group consisting of methyl, ethyl, and benzyl. Also included in my invention are the pharmaceutically acceptable acid addition and alkyl halide quaternary salts thereof.

The invention sought to be patented in another composition-of-matter aspect resides in the concept of a chemical compound useful mainly as an intermediate which has a molecular structure comprising a pregnen-20-one nucleus with a double bond stemming from C—5, an oxygen function at C—3, and a 16α-(1'-amino-1'-alkylethyl) substituent wherein said 1'-alkyl is selected from the group consisting of methyl, ethyl, and benzyl.

The invention sought to be patented in the process aspect of this invention resides in the concept of treating a 16-dehydro-20-ketopregnane selected from the group consisting of 4,16-pregnadiene-3,20-dione and 3β-OR-5,16-pregnadien-20-one wherein R is a member selected from the group consisting of hydrogen and lower alkanoyl, with a disubstituted methylamine selected from the group consisting of isopropylamine, sec.-butyl-amine, and α-methylphenethylamine, in the presence of light, in the wave length range of from about 2,200 A to about 3,200 A, whereby is produced a 16α-aminoalkylpregnane selected from the group consisting of 16α-(1'-amino-1'-alkylethyl)-4-pregnene-3,20-dione and 3β-OR-16α-(1'-amino-1'-alkylethyl)-5 -pregnen-20one wherein R is as above defined, and alkyl is a member selected from the group consisting of methyl, ethyl, and benzyl, said 16α-aminoalkylpregnanes being useful as intermediates and also being pharmacologically active. The process aspect of this invention also includes the concept of treating said aforedescribed 16α-aminoalkylpregnanes with an amine selected from the group consisting of a secondary and a tertiary amine in the presence of a lower alkanoic acid, and when said secondary amine is reacted with a 16-aminoalkylpregnane having a 3-keto-4-dehydro system, treating the product thereby formed with dilute acid, whereby is formed an androstenopyrroline selected from the group consisting of 3-keto-4-androsteno-[17α,16α-c]-2',5'-dimethyl-5'-alkyl-1'-pyrroline and 3β-OR-5-androsteno-[17α,16α-c]-2',5'-dimethyl-5'-alkyl-1'-pyrroline wherein R and alkyl are as hereinabove defined, said androstenopyrrolines having mild stimulant activity.

GENERAL DESCRIPTION OF THE INVENTION

Composition-of-Matter Aspect

Included among the physical embodiments of the pharmacologically active composition-of-matter aspect of this invention are androstenopyrrolines selected from the group consisting of 4-androstenes and 5-androstenes of the following structural formula I:

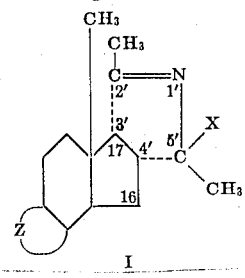

I wherein X is a member selected from the group consisting of methyl, ethyl, and benzyl, and Z is a member selected from the group consisting of

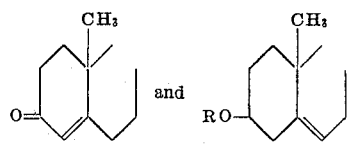

wherein R is a member selected from the group consisting of hydrogen and lower alkanoyl; and the pharmaceutically acceptable acid addition salts and lower alkyl halide quaternary salts thereof.

The compounds of formula I wherein X is ethyl or benzyl have a new asymetric center at C-5' due to which the compounds exist in two epimeric forms, both of which are included within my inventive concept. The physical embodiment of the compounds of formula I wherein X is ethyl or benzyl are manufactured and utilized as an epimeric mixture. In the specification and in claims of this application, the name of a compound wherein X is ethyl or benzyl includes both epimeric forms. Thus, the name 3β-acetoxy-5-androsteno-[17α,16-c]-2',5'-dimethyl-5'-ethyl-1'-pyrroline implicitly includes both epimeric forms at C-5'.

The lower alkanoyl groups included within the substituent "R" are preferably derived from lower alkanoic acids having up to 8 carbon atoms including acetic, propionic, n-butyric, iso-butyric, trimethylacetic, valeric, iso-valeric, caproic, and caprylic acid.

In this specification, the term "alkyl" includes benzyl (i.e. phenylmethyl) as well as methyl, ethyl and the like.

The androstenopyrrolines of this invention are named in accordance with accepted practice. As shown in formula I hereinabove, the numbering of the carbon atoms in the steroidal nucleus is that well known in the art; the numbering of positions in the pyrroline nucleus begins with the nitrogen atom and goes counter-clockwise so that the carbons numbered 3' and 4' in the pyrrolidene ring are the same carbon atoms numbered 17 and 16, respectively, in the steroid nucleus. Additionally, in accordance with accepted practice for fused ring systems, the bond between the 1 and 2 positions of the pyrroline nucleus is identified as a, that between the 2 and 3 positions as b, etc. Thus, the common bond in the fused ring system of the androstenopyrrolines of this invention is the c bond and the compounds are named as androsteno-[17α,16α-c]-1'-pyrrolines.

Preferred compounds of formula I are those wherein X is methyl, particularly those compounds wherein Z is

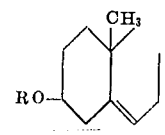

the compound wherein R is acetoxy, being particularly valuable, said compound being 3β-acetoxy-5-androsteno-[17α,16α-c]-2',5',5'1'-pyrroline.

Illustrative of other compounds defined by formula I are 3-keto-4-androsteno-[17α,16α-c]-2',5',5'-trimethyl-1'-pyrroline; 3β-acetoxy-5-androsteno-[17α,16-c]-2',5'-dimethyl-5'-benzyl-1'-pyrroline; 3-keto-4-androsteno-[17α,16α-c]-2',5'-dimethyl-5'-benzyl-1'-pyrroline; 3β-acetoxy-5-androsteno-[17α,16 α-c]-2',5'-dimethyl-5'-ethyl-1'-pyrroline; and 3-keto-4-androsteno-[17α,16α-c]-2',5'-dimethyl-5'-ethyl-1'-pyrroline.

The androstenopyrrolines of formula I are mild stimulants making them valuable in alleviating depression and/or fatigue, in the treatment of narcolepsy, and as an aid in performance enhancement.

Additionally, the 3β-lower alkanoyloxy-5-pregnenes of formula I (i.e. those wherein Z is

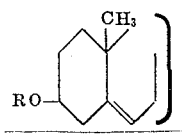

are aids in memory enhancement as demonstrated by their ability to accelerate the rate of acquisition of an avoidance response by mice.

In addition to the foregoing, the 3β-lower alkanoyloxy-5-androstenopyrrolines of this invention exhibit anti-inflammatory activity, this making them of value in the treatment of inflammatory states.

The compounds of formula I may be used as medicaments in conditions requiring a mild stimulant and can be administered to mammals orally, the dose administered being dependent on the size and age of mammal, and the severity of the condition being treated.

Also contemplated as within the composition-of-matter aspect of this invention are pharmaceutically acceptable acid addition salts of the androstenopyrrolines of formula I, which can be made according to known procedures by neutralizing the free base with the appropriate acid. Suitable acids for this purpose are such as hydrochloric, sulfuric, phosphoric, acetic, succinic, citric, maleic, and the like.

The physical embodiments of the acid addition salts of the androstenopyrrolines of formula I are generally characterized by being white to off-white solids which are usually soluble in water and to some degree in lower alkanols, e.g. methanol and ethanol, and are insoluble in most organic solvents. In general, the acid addition salts possess pharmacological activity similar to that possessed by the parent free base and are administered in a manner similar to that of the free base. The acid addition salts may also be used as an intermediate in the purification of the androstenopyrrolines of formula I, the androstenopyrrolines being precipitated from an organic solvent (e.g. ether) by the addition of acid, and the acid addition salt thus prepared, after isolation and recrystallization, can be converted to the pure free base by addition of dilute sodium hydroxide to an aqueous solution of the acid addition salt, whereby the purified androstenopyrroline of formula I separates as a solid.

Also included within the composition-of-matter aspect of this invention are the pharmaceutically acceptable alkyl halide salts of the androstenopyrrolines of formula I, e.g. the methyl iodide, methyl chloride, and methyl bromide quaternary salts. These are prepared from the corresponding free base utilizing known techniques such as treatment of an androstenopyrroline (e.g. 3β-acetoxy-5-androsteno-[17α,16-c]-2′,5′,5′1′-pyrroline) in either with an alkyl halide, e.g. methyl iodide for several hours, preferably in the dark. The methyl iodide quaternary salts thereby formed, e.g. 3β-acetoxy-5-androsteno-[17α,16α-c]-1′,2′,5′,5′-tetramethyl-1′-pyrrolinium iodide is isolated and purified utilizing known techniques.

The alkyl halide quaternary salts of the 4-androsteno-pyrrolines of formula I possess antibacterial activity and, as such, are useful to clean and sterilize laboratory glassware and surgical instruments, and may also be used in combination with soaps, detergents, and wash solutions for sanitation purposes as in the washing of hands, and in the cleaning and sanitizing of hospital rooms and areas used for food preparation such as kitchens, dining halls and the like.

Additionally, the alkyl halide quaternary salts of the 3-lower alkanoyloxy-5-androstenopyrrolines of formula I are hypotensive agents and, as such, are useful for treatment of hypertension.

The physical embodiments of the compounds of this invention which are useful as intermediates include 16α-aminoalkylpregnenes selected from the group consisting of 4-pregnenes and 5-pregnenes of the following formula II:

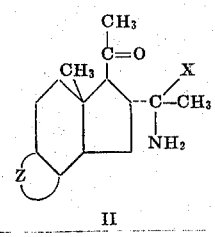

wherein X is a member selected from the group consisting of methyl, ethyl, and benzyl, and Z is a member selected from the group consisting of

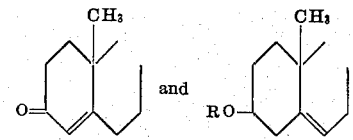

R being a member selected from the group consisting of hydrogen and lower alkanoyl; and the acid addition salts thereof.

The compounds defined by formula II are useful mainly as intermediates in the process aspect of my invention as described in detail hereinbelow, the preferred compounds being those compounds of formula II wherein X is methyl, particularly those wherein Z is

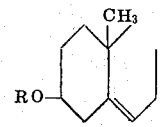

since these compounds (e.g. 3β-acetoxy-16α-(1′-amino-1′-methylethyl)-5-pregnen-20-one) are intermediates in preparing the preferred androsteno-[17α,16-c]-2′, 5′, 5′-trimethyl-1′-pyrrolines of formula I (e.g. 3β-acetoxy-5-androsteno-[17α,16α-c]-2′,5′,5′ < ¼-trimethyl-1′-pyrroline).

Typical compounds of formula II are 16α-aminoalkylpregnanes such as:

16α-(1′-amino-1′-methylethyl)-4pregnene-3,20-dione,

3β-acetoxy-16α(1′-amino-1′-methylethyl)-5-pregnen-20-one,

16α-(1′-amino-1′-ethylethyl)-4-pregnene-3,20-dione,

3β-acetoxy-16α-(1′-amino-1′-ethylethyl)-5-pregnen-20-one,

16α-(1′-amino-1′-benzylethyl)-4-pregnene-3,20-dione, and

3β-acetoxy-16α-(1′-amino-1′-benzylethyl)-5-pregnen-20-one.

In addition to being valuable as intermediates, the 16α-aminoalkylpregnanes of formula II are pharmacologically active per se exhibiting antibacterial and anti-inflammatory activity.

Included within the inventive concept are the acid addition salts of compounds of formula II which have activities similar to those of the free base and which may also be used as intermediates in purifying the 16α-aminoalkylpregnanes of formula II in the same manner as described hereinabove for the acid addition salts of the androstenopyrrolines of formula I.

PROCESS ASPECT OF THIS INVENTION

The process aspect of this invention provides a method for preparing novel 16α-(1'-amino-1'-alkylethyl) pregnanes of formula II which comprises treating a 16-dehydro-20ketopregnane selected from the group consisting of 4,16-pregnadiene-3,20-dione and 3β-OR-5,16-pregnadien-20-one wherein R is a member selected from the group consisting of hydrogen and lower alkanoyl, in the presence of light, with a disubstituted methylamine selected from the group consisting of isopropylamine, sec.-butylamine, and α-methylphenethylamine.

In my process, which comprises the photochemical addition of a primary amine to a 16-dehydro bond in a $\Delta^{16}$-20-keto-steroid, the amine adds to the steroid through a carbon-carbon bond (i.e. through the carbon bearing the amine function) to form a 16α-aminoalkyl derivative. This is surprising in view of the prior art teaching that a primary amine adds to a $\Delta^{16}$-20-ketosteroid through a carbon-nitrogen bond (i.e. the primary amine adds at the nitrogen end) to form a 16α-alkylamino steroidal derivative.

The process aspect of this invention also provides a method for converting the novel 16α-(1'-amino-1'-alkylethyl) pregnane intermediates of formula II in one step to the novel, pharmacologically active androsteno-[17α,16-c]-pyrrolines of formula I which comprises treating said 16α-(1'-amino-1'-alkylethyl)-pregnene of formula I with an amine selected from the group consisting of secondary amine and a tertiary amine in the presence of a lower alkanoic acid (preferably acetic acid) and, where a secondary amine is reacted with a 3-keto-4-dehydro intermediate, treating the product thereby formed with dilute acid, whereby is formed an androsteno-[17α,16α-c]-3',5'-dimethyl-5'-substituted-1'-pyrroline of formula I. This step of our process, which comprises isomerization of the acetyl function at C—17 together with an intramolecular condensation via dehydration involving the hydrogens on the nitrogen of the hindered, disubstituted methylamine and the 20-keto function, takes places under mild reaction conditions (i.e. essentially neutral conditions at about 100°C). This is surprising when one considers the prior art condensation of a 16α-aminoethyl-5-pregnen-20-one (wherein the aminoalkyl group is unsubstituted and thus unhindered) which utilizes a strong base (i.e. potassium t.-butoixde) as condensing agent to form the prior art androsteno-5,5-unsubstituted-1-pyrrolines.

My process is usually carried out by dissolving the 16-dehydropregnane starting steroid (e.g. 16-dehydroprogesterone or 16-dehydropregnenolone acetate) in a disubstituted-methylamine (e.g. isopropylamine, sec.-butylamine, or α-methylphenethylamine) and, while the solution is preferably under an inert atmosphere (e.g. argon or nitrogen), irradiating the solution at room temperature with a Hanovia 200 watt high-pressure lamp in a quartz vessel for no more than about two hours, then immediately distilling the primary amine from the reaction mixture at steambath temperatures (about 60°–100b$L$ C). The resulting 16α-(1'-amino-1'-alkylethyl)pregnene of formula II is conveniently isolated from the residue by dissolving the residue in an organic solvent immiscible with water, e.g. ether, followed by treatment of the organic solvent with an acid (e.g. hydrochloric acid) whereby the acid addition salt of a compound of formula II is formed and remains in water solution and the impurities remain in the organic solution. Isolation of the free amine of formula II is then easily effected by adding a base such as dilute aqueous sodium hydroxide until the solution is slightly alkaline whereby the 16α-aminoalkylpregnane of formula II separates as a solid which is then purified utilizing known methods such as crystallization and chromatographic techniques.

In carrying out the physical embodiment of this step of my process, the addition takes place with greatest speed and in greatest yield when irradiated with light in wave lengths of from about 2,200 A to about 3,500 A, such as supplied by a Hanovia 200 watt high-pressure lamp. The addition reaction is usually essentially complete within about 2 hours. In view of this relatively short reaction time and the immediate removal of the excess primary amine, there is eliminated the possible competing Michael reaction which is not catalyzed by light.

In this step of my process, the primary disubstituted-methylamine reagent advantageously also serves as solvent. An organic inert solvent, e.g. benzene, acetone and hexane, may also be employed, although the presence of a solvent tends to slow the rate of the addition reaction.

The photochemical addition step is preferably carried out at room temperature (i.e. around 25° C), although the reaction may be carried out at temperatures in the range of from 0° C to about 50° C.

In carrying out the physical embodiment of the second step of my process (i.e. the isomerization and cyclization step) the 16α-(1'-amino-1'-alkylethyl)-pregnen-20-one of formula II is usually dissolved in an ethereal solvent (such as dioxane, tetrahydrofuran, 1,2-dimethoxyethane and the like) together with a secondary amine (e.g. piperidine, pyrrolidone, and morpholine), or preferably a tertiary amine such as trimethylamine, N-methylmorpholine, and preferably pyridine. A lower alkanoic acid (usually acetic acid) is added to the reaction mixture preferably in an amount equimolar to that of the amine, and the resulting essentially neutral reaction mixture is heated at reflux temperatures for about 18 hours or until no starting material is present as evidenced by thin layer chromatographic data. The resultant cyclized product, i.e. an androsteno-[17α,16α-c]-2',5'-dimethyl-5'-alkyl-1'-pyrroline of formula I is usually conveniently isolated by pouring the reaction mixture into water and separating the product either by filtration or extraction followed by purification via recrystallization or chromatographic techniques.

In carrying out the physical embodiment of this step of my process, best yields are obtained when the molar quantities of secondary or tertiary amine are about equimolar to that of the alkanoic acid present so that the reaction mixture is essentially neutral. While the highest yields are obtained in essentially neutral media, the quantities of lower alkanoic acid and mild base need not be equivalent to form an androsteno-pyrroline of formula I.

It is believed the presence of the mild basic medium supplied by a secondary or tertiary amine sets up an equilibrium between the 17β-acetyl function of the 16α-aminoalkylpregnane and the 17α-acetyl epimer thereof, while the presence of the mild acid promotes cyclization via dehydration at C—20 of the 17α-acetyl epimeric form in the equilibrium mixture of the epimers at C—17. I have found that if the reaction mixture is made strongly basic, a compound of formula II will not cyclize to produce a compound of formula I in isolatable quantities. When the basic reagent is a mild base such as a secondary or tertiary amine, in accordance with my process, cyclization occurs in good yield to form a pyrroline of formula I.

The lower alkanoic acids which are conveniently used in my process are those derived from alkanoic acids having up to 8 carbon atoms such as caprylic, trimethyl acetic, butyric, propionic, and, preferably acetic acid.

When 16α-(1'-amino-1'-alkylethyl)-pregnenes of formula II having a 3-keto-4-dehydro-system are the starting compounds for the second step of my process, it is preferably to utilize a tertiary amine in the cyclization step of my process, since the use of a secondary amine such as piperidine will result in the formation of eneamines at C—3, necessitating addition of dilute acid such as aqueous acetic acid, aqueous hydrochloric acid, aqueous perchloric acid to hydrolyze the eneamine and regenerate the free 3-keto-4-dehydro-system.

A preferred method of carrying out my inventive process is that utilizing isopropylamine in the first step since thereby are prepared the preferred intermediates of formula II, i.e. the 16α(1'-amino-1'-methylethyl)-pregnane-20-ones which upon treatment with a mixture of a weak acid and weak base according to the second step of my process will lead to the preferred androsteno-[17α,16α-c]-2',5',5'1'-pyrroline of formula I.

In one preferred mode of the physical embodiment of the process aspect of my invention, 3β-acetoxy-5,16-pregnadien-20-one in a large molar excess of isopropylamine, (e.g. over 500 molar excess) while under an atmosphere of nitrogen, is irradiated with a Hanovia 200 watt high-pressure lamp until most of the starting compound has reacted (preferably no more than about 2 hours). Isolation of the resultant 3β-acetoxy-16α-(1'-amino-1'-methylethyl)-5-pregnen-20-one of formula II is effected by immediately distilling off at low temperatures the excess isopropylamine dissolving the residue in ether and extracting with dilute aqueous acid (e.g. 1 percent hydrochloric acid) followed by neutralization of the acid solution by the addition of base (e.g. 5 percent sodium hydroxide) and collection of the 3β-acetoxy-16α-(1'-amino-1'-methylethyl)-5-pregnen-20-one by filtration. Purification is effected by crystallization in known manner.

Treatment of the 16α-(1'-amino-1'-methylethyl)-5-pregnen-20-one dissolved in dioxane with a two molar excess of pyridine or piperidine to which is added an approximately equimolar quantity of acetic acid at reflux temperature for about 18 hours yields a preferred compound of this invention, i.e. 3β-acetoxy-5-androsteno-[17α,16α-c]-2',5',5'1'-pyrroline which is isolated by addition of water to the reaction mixture followed by filtration or extraction of the insoluble fraction and purification thereof utilizing methods known in the art such as crystallization or chromatographic techniques.

The methods of carrying out my inventive process are illustrated in the examples which follow. It is understood, that obvious modifications of my process which will be suggested by these examples to one skilled in the art, are encompassed within this inventive concept. It is understood further that my invention is limited only by my claims set forth hereinbelow.

EXAMPLE 1

3-Keto-4-androsteno-[17α,16α-c]-2',5',5'-trimethyl-1'-pyrroline

A. 16α-(1'-Amino-1'-methylethyl)-4-pregnene-3,20-dione

Irradiate a solution of 6.4 g. of 4,16-pregnadiene-3,20-dione in 175 ml. of isopropylamine under an atmosphere of nitrogen for 2 hours with a Hanovia 200 watt high-pressure lamp in a quartz vessel. Immediately evaporate the isopropylamine at steam bath temperature and dissolve the resultant residue in ethyl ether. Extract the ethereal solution with four 100 ml. portions of 1N hydrochloric acid solution. Combine the hydrochloric acid extracts and add 10 percent aqueous sodium hydroxide until the solution is basic. Extract the resultant basic mixture with ethyl ether-ethyl acetate (1:1). Combine the organic solutions and dry over sodium sulfate and concentrate in vacuo to a small volume, cool and filter the resultant crystalline precipitate comprising 16α-(1'-amino-1'-methylethyl)-4-pregnene-3,20-dione.

Purify by recrystallization from methylene chloride iso-propyl ether to yield 3.56 g. of 16α-(1'-amino-1'-methylethyl)-4-pregnene-3,20-dione, m.p. = 170° — 180° C; $[\alpha]_D^{25}$ +126.1° (chloroform).

B. 3-Keto-4-androsteno-[17α,16α-c]-2',5',5'-trimethyl-1'-pyrroline

To a solution of 1.2 g. of 16α-(1'-amino-1'-methylethyl)-4-pregnene-3,20-dione in 50 ml. dioxane, add 0.485 ml. of pyridine and 0.342 ml. of acetic acid. Heat the solution at reflux temperature for 12 hours; then pour the reaction mixture onto a mixture of ice and water containing sodium bicarbonate and sodium chloride. Collect by filtration, wash and dry the resultant precipitate comprising 880 mg. of 3-keto-4-androsteno-[17α, 16α-c]-2',5',5'-trimethyl-1'-pyrroline. Purify further by crystallization from ether, m.p. = 150° — 152°C; $[\alpha]_D^{25}$ −41.5° (dioxane).

EXAMPLE 2

3β-Acetoxy-5-androsteno-[17α, 16α-c]-2',5',5'-trimethyl-1'-pyrroline and the Corresponding 3-hydroxy Derivative A. 16α-(1'-Amino-1'-methylethyl)-5-pregnen-3β-ol-20-one 3-acetate Irradiate a solution of 10 g. of 4,16-pregnadien-3β-ol-20-one 3-acetate in 200 ml. of isopropylamine under an atmosphere of nitrogen for two hours a Hanovia 200 watt high-pressure lamp in a quartz vessel. Immediately evaporate the isopropylamine at steam bath temperature. Dissolve the resultant residue in about 375 ml. of ether and extract the ethereal solution with 1 percent hydrochloric acid solution (about 375 ml.). Add 5 percent aqueous sodium hydroxide to the hydrochloric acid extract until the extract is slightly basic. Collect the resultant precipitate by filtration and wash and air dry the precipitate comprising 16α-(1'-amino-1'-methylethyl)-5-pregnen-3β-ol-20-one 3-acetate. Purify by crystallization from methylene chloride-acetone hexane, m.p. = 165° — 170°C; $[\alpha]_D^{25}$ +1.6° (dioxane).

B. 3β-Acetoxy-5-androsteno-[17α,16α-c]-2',5',5'-trimethyl 1'-pyrroline and the corresponding 3β-hydroxy derivative 1. To a solution of 2.08 g. of 16α-(1'-amino-1'-methyl-ethyl)-5-pregnen-3β-ol-20-one 3-acetate in 50 ml. of dioxane, add 0.93 ml. of piperidine and 0.57 ml. of acetic acid. Heat the solution at reflux temperature for 18 hours, then pour into a large volume of water. Collect by filtration and air dry the resultant precipitate comprising 3β-acetoxy-5-androsteno-[17α,16α-c]-2',5',5' < ¼-trimethyl-1'-pyrroline. Purify by chromatographing the precipitate over silica gel (18 × 2.5 cm.) eluting with methylene chloride. Evaporate the combined methylene chloride eluates and crystallize the resultant residue from methylene chloride-hexane to obtain 3β-acetoxy-5-androsteno-[17α,16α-c]-2',5',5'1'-pyrroline, m.p. 171°–174° C; $[\alpha]_D^{25}$ − 135.2° (dioxane).

2. Alternatively, the compound of this example and the 3β-hydroxy derivative thereof are prepared as follows:
To a solution of 6.24 g. of 16α-(1'-amino-1'-methylethyl)-5-pregnen-3β-ol-20-one 3-acetate in 100 ml. of dioxane, add 2.79 ml. of piperidine and 1.81 ml. of glacial acetic acid. Heat the solution at reflux temperature for 3 days, then pour into a large volume of water. Collect the resultant precipitate by filtration and extract the aqueous filtrate with methylene chloride. Combine the methylene chloride extracts with the precipitate and chromatograph the methylene chloride solution over silica gel eluting with methylene chloride-ethyl acetate (9:1). Combine the eluates and evaporate to a residue; then recrystallize the residue from ethyl acetate methanol to obtain 3.8 g. of 3β-acetoxy-5-androsteno-[17α,16α-c]-2',5',5'1'-pyrroline.

The 3β-hydroxy compound is obtained by eluting the silica gel column a second time with methylene chloride-ethyl acetate (1:1). Combine the eluates and evaporate to a residue comprising 160 mgm. of 3β-hydroxy-5-androsteno-[17α,16α-c]-2',5',5'-trimethyl-1'-pyrroline. Purify by recrystallization from methylene chloride-hexane, m.p.=235°—241° C; $[\alpha]_D^{25}$ −147.3° (dioxane).

EXAMPLE 3

3β-Acetoxy-5-androsteno-[17α,16α-c]-1',2',5',5'-tetramethyl-

1'-pyrrolinium iodide

To a solution of 500 mgm. of 3β-acetoxy-5-androsteno-[17α,16α-c]-2',5',5'1'-pyrroline in 50 ml. of ether, add 9 ml. of methyl iodide. Stir the reaction mixture for two days at room temperature. Collect the resultant precipitate by filtration to obtain 609 mgm. of 3β-acetoxy-5-androsteno-[17α,16α-c]-1',2',5'-tetramethyl-1'-pyrrolinium iodide. Purify by crystallization from methanol-ether, m.p.=255°—260°C (decomposition); $[\alpha]_D^{25}$ −54.6°(dioxane).

EXAMPLE 4

3-Keto-4-androsteno-[17α,16α-c]-1',2',5',5'-tetramethyl-

1'-pyrrolinium iodide

To a solution of 300 mgm. of 3-keto-4-androsteno-[17α,16α]-2',5',5'-trimethyl-1'-pyrroline in 50 ml. of ether, add 6 ml. of methyl iodide and stir the reaction mixture in the dark for six hours. Collect the resultant precipitate by filtration and wash the precipitate with ether and air dry to give 210 mgm. of 3-keto-4-androsteno- [17α,16α-c]-1',2',5',5'-tetra-methyl-1'-pyrrolinium iodide, $[\alpha]_D^{25}$ −38° (dioxane).

EXAMPLE 5

3β-Acetoxy-5-androsteno-[17α,16α-c]-2',5'-dimethyl-5'-benzyl

1'-pyrroline and the Methyl Iodide Quaternary Salt Thereof

A. 16α-(1'-Amino-1'-benzylethyl)-5-pregnen-3β-ol-20-one 3-acetate

Irradiate a solution of 10 g. of 5,16-pregnadien-3β-ol-20-one 3-acetate in 200 ml. of α-methylphenethylamine under nitrogen for 2 hours with a Hanovia 200 watt high-pressure lamp in a quartz vessel. Immediately distill the α-methylphenethyl-amine in vacuo. Dissolve the resultant residue in 400 ml. of ether and extract with a 1 percent hydrochloric acid solution. Add 5 percent sodium hydroxide to the hydrochloric acid extract until the solution is alkaline. Collect by filtration and dry the resultant precipitate to obtain 16α-(1'-amino-1'-benzylethyl)-5-pregnen-3β-ol-20-one 3-acetate. Purify by crystallization from ethyl acetate-hexane.

B. 3β-Acetoxy-5-androsteno-[17α,16α-c]-2',5'-dimethyl-5'-benzyl-1'-pyrroline

To a solution of 3 g. of 16α-(1'-amino-1'-benzylethyl)-5-pregnen-3β-ol-20-one 3-acetate in 70 ml. of dioxane, add 1.24 ml. of piperidine and 0.76 ml. of acetate acid. Heat the reaction mixture at reflux temperature for 17 hours. Concentrate the reaction mixture in vacuo to a volume of about 20 ml., then add to ice water. Collect by filtration and air dry the resultant precipitate. Purify the precipitate by chromatography over silica gel eluting with methylene chloride. Combine the methylene chloride eluates, evaporate to a residue, then crystallize the resultant residue from acetone-hexane to give 3β-acetoxy-5-androsteno-[17α,16α-c]-2',5'-dimethyl-5'-benzyl-1'-pyrroline.

C. 3β-Acetoxy-5-androsteno-[17α,16α-c]-1',2',5' trimethyl-5'-benzyl 1'pyrrolinium iodide To a solution of 500 mgm. of 3β-acetoxy-5-androsteno-[17α,16α-c]-2',5'-dimethyl-5'-benzyl-1'-pyrroline in 40 ml. of ether, add 10 ml. of methyl iodide. Stir the reaction mixture in the dark for 20 hours. Collect the result precipitate by filtration, wash the precipitate with ether and air dry to give 3β-acetoxy-5-androsteno-[17α,16-c]-1',2',5'5'-benzyl-1'-pyrrolinium iodide.

EXAMPLE 6

3-Keto-4-androsteno-[17α,16α-c]-2',5'-dimethyl-5'-benzyl-1'-pyrroline and the Methyl Iodide Quaternary Salt Thereof A. 16α-(1'-Amino-1'-benzylethyl)-4-pregnene-3,20-dione Irradiate a solution of 5 g. of 4,16-pregnadiene-3,20-dione in 200 ml. of α-methylphenethylamine under nitrogen for 90 minutes with a Hanovia 200 watt high-pressure lamp in a quartz vessel. Immediately distill the α-methylphenethylamine in vacuo. Dissolve the resultant residue in ether and extract with a 1 percent hydrochloric acid solution. Add 10 percent sodium hydroxide until the hydrochloric acid extract becomes alkaline. Extract the aqueous alkaline mixture with ether and ethyl acetate. Combine the organic extracts, dry over sodium sulphate, and concentrate to small volume. Crystallize the residue from ethyl acetate-hexane to obtain 16α-(1'-amino-1'-benzylethyl)-4-pregnene-3,20-dione.

B. 3-Keto-4-androsteno-[17α,16α-c]-2',5'-dimethyl-5'-benzyl-1'-pyrroline

To a solution of 900 mgm. of 16α-(1'-amino-1'-benzylethyl)-4-pregnene-3,20-dione in 40 ml. of dioxane, add 0.37 ml. of pyridine and 0.26 ml. of acetic acid. Heat the reaction mixture for 18 hours at reflux temperature. Concentrate in vacuo to a volume of about 20 ml., then add to ice water. Collect the resultant precipitate by filtration, wash with water, then dry the precipitate to obtain 3-keto-4-androsteno-[17α,16α]-2',5'-dimethyl-5'-benzyl-1'-pyrroline. Purify by crystallization from ethyl acetate.

C. 3-Keto-4-androsteno-[17α,16α-c]-1',2',5'-trimethyl-5'-benzyl-1'-pyrrolinium iodide To a solution of 360 mgm. of 3-keto-4-androsteno-[17α,16α]-2',5'-dimethyl-5'-benzyl-1'-pyrroline in 55 ml. of ether, add 8 ml. of methyl iodide. Stir the reaction mixture in the dark for 7 hours, then collect the resultant precipitate by filtration. Wash the precipitate with ether and air-dry to obtain 3-keto-4-androsteno-[17α,16α]-1',2',5'-trimethyl-5'-benzyl-1'-pyrrolinium iodide.

EXAMPLE 7

3β-Acetoxy-5-androsteno-[17α,16α-c]-2',5'-dimethyl-5'-ethyl-1'-pyrroline and the Methyl Iodide Quaternary Salt Thereof A. 16α-(1'-Amino-1'-ethylethyl)-5-pregnen-3β-ol-20-one 3-acetate Irradiate a solution of 7.5 g. of 3β-acetoxy-5,16-pregnadien-20-one in 200 ml. of sec.-butylamine under nitrogen for two hours with a Hanovia 200 watt high-pressure lamp in a quartz vessel. Evaporate the sec.-butylamine rapidly, dissolve the resultant residue in ether, then extract the ethereal solution with a 1 percent hydrochloric acid solution. Add 10 percent sodium hydroxide to the hydrochloric acid extracts until the solution is alkaline. Extract the alkaline solution with ethyl acetate, dry the combined organic extracts over sodium sulphate, then concentrate to a low volume and crystallize by addition of hexane to obtain 16α-(1'-amino-1'-ethylethyl)-5-pregnen-3β-ol-20-one 3-acetate.

B. 3β-Acetoxy-5-androsteno-[17α,16α-c]-2',5'-dimethyl-5'-ethyl-1'-pyrroline

To a solution of 2.26 g. of 16α-(1'-amino-1'-ethylethyl)-5-pregnen-3β-ol-20-one 3-acetate in 45 ml. of dioxane, add 0.93 ml. of piperidine and 0.57 ml. of acetic acid. Heat the reaction mixture at reflux temperature for 20 hours, then add to ice water. Collect the resultant precipitate by filtration and air dry. Crystallize the precipitate from ether-isopropyl ether to obtain 3β-acetoxy-5-androsteno-[17α,16α-c]-2',5'-dimethyl-5'-ethyl-1'-pyrroline.

C. 3β-Acetoxy-5-androsteno-[17α,16α-c]-1',2',5' trimethyl-5'-ethyl-1'pyrrolinium iode To a solution of 720 mgm. of 3β-acetoxy-5-androsteno-[17α,16α-c]-2',5'-dimethyl-5'-ethyl-1'-pyrroline in 80 ml. of ether, add 10 ml. of methyl iodide. Stir the reaction mixture in the dark for 24 hours, then add 10 ml. of additional methyl iodide and continue stirring for 2 more days. Pour off the supernatant liquid, and triturate the gummy residue with isopropyl ether. Collect the resultant amorphous solid by filtration, wash the solid with ether, then air dry to obtain 3β-acetoxy-5-androsteno-[17α,16α-c]-1',2',5'trimethyl-5'-ethyl-1'-pyrrolinium iodide.

EXAMPLE 8

3-Keto-4-androsteno-[17α,16α-c]-2',5'-dimethyl-5'-ethyl-1'-pyrroline and the Methyl Iodide Quaternary Salt Thereof A. 16α-(1'-amino-1'-ethylethyl)-4-pregnene-3,20-dione Irradiate a solution of 5 g. of 4,16-pregnadiene-3,20-dione in 200 ml. of sec.-butylamine under nitrogen for 1 ¾ hours with a Hanovia 200 watt high-pressure lamp in a quartz vessel. Immediately evaporate the sec.-butylamine. Dissolve the resultant residue in ether, extract the ethereal solution with 1N hydrochloric acid, then add 10 percent sodium hydroxide to the hydrochloric acid extracts until they are alkaline. Extract the resultant basic mixture with ethyl acetate, dry the combined extracts over sodium sulphate, then evaporate to a small volume. Crystallize the resultant residue from ethyl acetate-hexane to obtain 16α-(1'-amino-1'-ethylethyl)-4-pregnene-3,20-dione.

B. 3-Keto-4-androsteno-[17α,16α-c]-2',5'-dimethyl-5'-ethyl-1'-pyrroline

To a solution of 670 mgm. of 16α-(1'-amino-1'-ethylethyl)-4-pregnene-3,20-dione in 35 ml. of dioxane, add 0.29 ml. of pyridine and 0.19 ml. of acetic acid. Heat the reaction mixture at reflux temperature for 17 hours. Add the reaction mixture to ice water, collect the resultant precipitate by filtration, wash with water, and dry. Purify the resultant precipitate by crystallization from ether-isopropyl ether to obtain 3-keto-4-androsteno-[17α,16α-c]-2',5'-dimethyl-5'-ethyl-1'-pyrroline.

C. 3-Keto-4-androsteno-[17α,16α-c]-1',2',5'-trimethyl-5'-ethyl-1'-pyrrolinium iodide To a solution of 500 mgm. of 3-keto-4-androsteno-[17α,16α]-2',5'-dimethyl-5'-ethyl-1'-pyrroline in 40. ml. of dry tetrahydrofuran, add 10 ml. of methyl iodide. Stir the reaction mixture in the dark for 6 hours. Collect the resultant precipitate by filtration, wash the precipitate with tetrahydrofuran, and dry to obtain 3-keto-4-androsteno-[17α,16α-c]-1',2',5'-trimethyl-5'-ethyl-1'-pyrrolinium iodide.

EXAMPLE 9

16α-(1'-dimethylamino-1'-methylethyl)-5-pregnene-3β-ol-20-one- 3-acetate

To a solution of 831 mgm. of 16α-(1'-amino-1'-methyl-ethyl)-5-pregnen-3β-ol-20-one 3-acetate in 20 ml. of 90 percent formic acid, add 0.65 ml. of 35 percent formaldehyde. Heat the solution at reflux temperature for 10 hours. Add 0.4 ml. of concentrated hydrochloric acid. Evaporate the formaldehyde and formic acid in vacuo and dissolve the resultant residue in water. Add 10 percent sodium hydroxide to the aqueous solution until it is alkaline. Filter the resultant precipitate, wash with water and dry. Re-acetylate the precipitate with acetic anhydride in pyridine at room temperature according known procedures. Crystallize the resultant product from methyl alcohol-ethyl acetate to obtain 16α-(1'-dimethylamino-1'-methylethyl)-5-pregnen-3β-ol-20-one 3-acetate 16α-(1'-dimethylamino-1'-benzylethyl)-5-pregnen-3β-ol-20-one 3-acetate To a solution of 1.978 g. of 16α-(1'-amino-1'-benzylethyl)-5-pregnen-3β-ol-20-one 3-acetate in 45 ml. of formic acid, add 1.2 ml. of 35 percent formaldehyde. Heat the solution at stem bath temperature for 12 hours. Add 0.85 ml. of concentrated hydrochloric acid, then evaporate the formaldehyde and formic acid in vacuo. Dissolve the resultant residue in water and add 2N sodium hydroxide until the solution is alkaline. Filter, wash and dry the resultant precipitate. Re-acetylate the precipitate with acetic anhydride in pyridine at room temperature according to known procedure.

Crystallize the re-acetylated material from methanol to give 16α-(1'-dimethylamino-1'-benzylethyl)-5-pregnen-3β-ol-20-one 3-acetate.

EXAMPLE 11

16α-(1'-dimethylamino-1'-methylethyl)-4-pregnene-3,20-dione

To a solution of 745 mgm. of 16α-(1'-amino-1'-methylethyl)-4-pregnene-3,20-dione in 18 ml. of 90 percent formic acid, add 0.6 ml. of 35 percent formaldehyde. Heat the reaction mixture at reflux temperature for 8 hours. Add 0.4 ml. of concentrated hydrochloric acid, then evaporate in formaldehyde and formic acid in vacuo. Dissolve the resultant residue in water and add 2N sodium hydroxide until the solution is alkaline. Filter the resultant precipitate, wash, air dry, and pyrify by crystallization from ethyl acetate-ether to obtain 16α-(1'-dimethylamino-1'-methylethyl)-4-pregnene-3,20-dione.

EXAMPLE 12

3β-Acetoxy-16-(1'-amino-1'-methylethyl)-5-pregnen-20-one hydrochloride

A. Bubble anhydrous hydrogen chloride gas through a solution of 2.5 g. of 3β-acetoxy-16α-(1'-amino-1'-methylethyl)-5-pregnen-20-one in 75 ml. of ether at a slow rate for about 20 minutes. Separate by filtration the resultant crystalline precipitate, then thoroughly wash the precipitate with 550 ml. of anhydrous ether and dry in vacuo to obtain 3β-acetoxy-16α-(1'-amino-1'-methylethyl)-5-pregnen-20-one hydrochloride.

B. In similar manner treat each of the following with anhydrous hydrogen chloride in ether:

16α-(1'-amino-1'-methylethyl)-4-pregnene-3,20-dione,

3β-acetoxy-16α-(1'-amino-1'-benzylethyl)-5-pregnen-20-one,

16α-(1'-amino-1'-benzylethyl)-4-pregnene-3,20-dione,

3β-acetoxy-16α-(1'-amino-1'-ethylethyl)-5-pregnene-20-one, and

16α-(1'-amino-1'-ethylethyl)-4-pregnen-3,20-dione.

Isolate and purify the resultant products in a manner similar to that described hereinabove to obtain the corresponding hydrochloride acid salts, namely, 16α-(1'-amino-1'-methylethyl)-4-pregnen-3,20-dione hydrochloride, 3β-acetoxy-16α-(1'-amino-1'-benzylethyl)-5-pregnen-20-one hydrochloride, 16α-(1-amino-1'-benzylethyl)-4-pregnene-3,20-dione hydrochloride, 3β-acetoxy-16α-(1'-amino-1'-ethylethyl)-5-pregnen-20-one hydrochloride, and 16α-(1'-amino-1'-ethylethyl)-4-pregnene-3,20-dione hydrochloride.

EXAMPLE 13

3β-Acetoxy-5-androsteno-[17α,16α-c]-2',5',5'-trimethyl-1'-pyrroline hydrochloride A. Through a solution of 1.77 g. of 3β-acetoxy-5-androsteno-[17α,16α-c]-2',5',5'1'-pyrroline in 65 ml. of anhydrous ether, bubble dry hydrogen chloride gas for a period of about 15 minutes. Separate the resultant white amorphous solid by filtration, wash the filtrate several times with ether, then dry in vacuo to obtain 3β-acetoxy-5-androsteno-[17α,16α-c]-2',5',5'-trimethyl-1'-pyrroline hydrochloride.

B. In similar manner treat each of the following androsteno pyrrolines with dry hydrogen chloride gas in ether:

3-keto-4-androsteno-[17α,16α-c]-2',5',5'-trimethyl-1'-pyrroline hydrochloride,

3β-acetoxy-5-androsteno-[17α,16α-c]-2',5'-dimethyl-5'-benzyl-1'-pyrroline, 3-keto-4-androsteno-[17α,16α-c]-2',5'-dimethyl-5'-benzyl-1'-pyrroline, 3β-acetoxy-5-androsteno-[17α,16α-c]-2',5'-dimethyl-5'-ethyl-1'-pyrroline, and 3-keto-4-androsteno-[17α,16α-c]-2',5'-dimethyl-5'-ethyl-1'-pyrroline. Isolate and purify the resultant respective products in a manner similar to that described hereinabove to obtain, respectively, 3-keto-4-androsteno-[17α, 16α-c]-2',5',5'-trimethyl-1'-pyrroline hydrochloride, 3β-acetoxy-5-androsteno-[17α,16α-c]-2',5'-dimethyl-5'-benzyl-1'-pyrroline hydrochloride, 3-keto-4-androsteno-[17α,16α-c]-2',5'-dimethyl-5'-benzyl-1'-pyrroline hydrochloride, 3β-acetoxy-5-androsteno-[17α,16α-c]-2',5'-dimethyl-5'-ethyl-1'-pyrroline hydrochloride, and 3-keto-4-androsteno-[17α,16α-c]-2',5'-dimethyl-5'-ethyl-1'-pyrroline hydrochloride.

I claim:

1. A compound selected from the group consisting of 4-androstenes and 5-androstenes of the following structural formula:

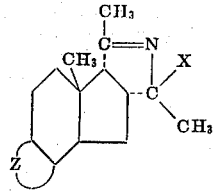

wherein X is a member selected from the group consisting of methyl, ethyl, and benzyl, and Z is a member selected from the group consisting of

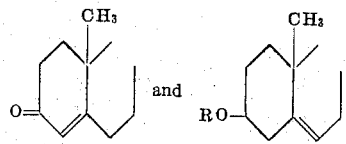

wherein R is a member selected from the group consisting of hydrogen and lower alkanoyl; and the pharmaceutically acceptable acid addition salts and lower alkyl halide quaternary salts thereof.

2. A compound according to claim 1 wherein X is methyl.

3. A 4-androstene of claim 1 wherein X is methyl and Z is

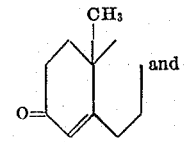

said compound being 3-keto-4-androsteno-[17α,16α-c]-2',5',5'-trimethyl-1'-pyrroline.

4. A 5-androstene of claim 1 wherein X is methyl and Z is

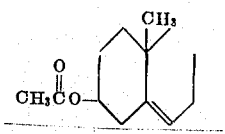

said compound being 3β-acetoxy-5-androsteno-[17α,16-c]-2',5',5'1'-pyrroline.

5. A methiodide quaternary salt of a 5-androstene of claim 1 wherein X is methyl and Z is

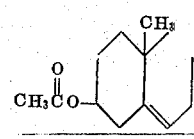

said compound being 3β-acetoxy-5-androsteno-[17α,16-c]-1',2',5',5'-tetra-methyl-1'-pyrrolinium iodide.

6. A compound selected from the group consisting of 4-pregnenes and 5-pregnenes of the following formula:

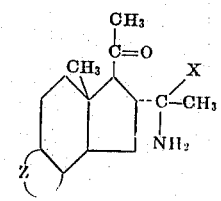

wherein X is a member selected from the group consisting of methyl, ethyl, and benzyl, and Z is a member selected from the group consisting of

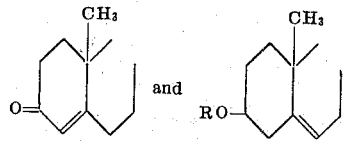

R being a member selected from the group consisting of hydrogen and lower alkanoyl; and the acid addition salts thereof.

7. A compound according to claim 6 wherein X is methyl.

8. A 5-pregnene compound according to claim 6 wherein X is methyl and Z is

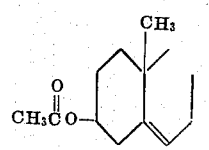

said compound being 16α-(1'-amino-1'-methylethyl)-4-pregnen-3β-ol-20-one 3-acetate.

9. A 4-pregnene compound according to claim 6 wherein X is methyl and Z is

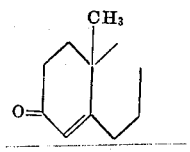

, said compound being 16α-(1'-amino-1'-methylethyl)-4-pregnene-3,20-dione.

10. A process for the preparation of a 16α-aminoalkyl-pregnane of following formula I;

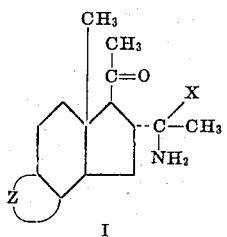

wherein X is a member selected from the group consisting of methyl, ethyl, and benzyl, and Z is a member selected from the group consisting of

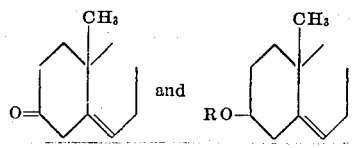

R being a member selected from the group consisting of hydrogen and lower alkanoyl;
which comprises treating a 16dehydro-20-ketopregnane selected from the group consisting of 4,16-pregnadiene-3,20-dione and 3β-OR-5,16-pregnadien-20-one wherein R is as hereinabove defined, with a di-substituted methylamine selected from the group consisting of isopropylamine, sec.-butylamine, and α-methylphenethylamine in the presence of light in the wave length range of from about 2,200 A to about 3,500 A.

11. The process according to claim 10 wherein said di-substituted methylamine is isopropylamine whereby is obtained a 16α-aminoalkylpregnane of formula I wherein X is methyl.

12. The process according to claim 10 wherein said 16-dehydro-20-keto pregnene is 3β-acetoxy-5,16-pregnadien-20-one, and said di-substituted methylamine is isopropylamine whereby is obtained 16α-(1'-amino-1'-methylethyl)-5-pregnen-3β-ol-20-one 3-acetate.

13. The process of claim 10 including the added step of treating the thereby formed 16α-aminoalkyl-pregnane of formula I with an amine selected from the group consisting of a secondary and a tertiary amine in the presence of a lower alkanoic acid, said process comprising treating a 16-dehydro-20-ketopregnane selected from the group consisting of 4,16-pregnadiene-3,20-dione and 3β-OR-5,16-pregnadien-20-one, R being a member selected from the group consisting of hydrogen and lower alkanoyl, with a di-substituted methylamine selected from the group consisting of sec.-butylamine, and α-methylphenethylamine, in the presence of light in the wave length range of from about 2,200 A to about 3,500A, whereby is formed a 16α-alkylaminopregnane of following formula I:

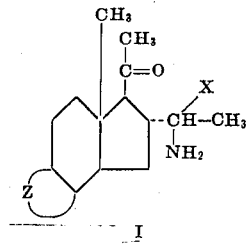

wherein X is a member selected from the group consisting of methyl, ethyl, and benzyl, and Z is a member selected from the group consisting of

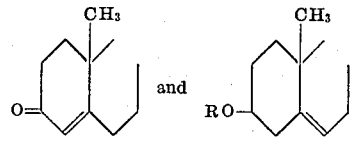

R being as hereinabove defined,
and treating the thereby formed 16α-aminoalkyl-pregnane of formula I with an amine selected from the group consisting of a secondary and a tertiary amine in a lower alkanoic acid, and when a secondary amine is used with a compound wherein Z is

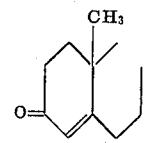

treating the product thereby formed with dilute acid, whereby is formed an androstenopyrroline of following formula II:

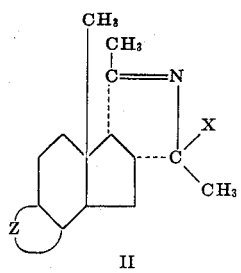

wherein X and Z are as hereinabove defined for formula I.

14. The process according to claim 13 wherein said amine is a tertiary amine.

15. The process according to claim 13 wherein said amine and said lower alkanoic acid are about equimolar.

16. The process according to claim 13 wherein said amine is a tertiary amine, and said lower alkanoic acid is acetic acid, and said tertiary amine and acetic acid are about equimolar.

17. The process of claim 13 wherein said 16-dehydro-20-keptopregnane is 4,16-pregnadiene-3,20-dione, said di-substituted methylamine is isopropylamine, said amine is pyridine, and said lower alkanoic acid is acetic acid, the molar quantity of said acetic acid being about twice the molar quantity of said 4,16-pregnadiene-3,20-dione, said acetic acid and pyridine being equimolar, said process comprising treating 4,16-pregnadiene-3,20-dione with isopropylamine in the presence of light in the wave length range of from about 2,200 A to about 3,500 A and treating the thereby formed 16α-(1'-amino-1'-methylethyl)-4-pregnene-3,20-dione with acetic acid and pyridine, the molar quantity of acetic acid being about twice the molar quantity of said 16α-(1'-amino-1'-methyl-ethyl)-4-pregnene-3,20-dione and the pyridine being about equimolar to the acetic acid, whereby is formed 3-keto-4-androsteno-2',5',5'-trimethyl-1'-pyrroline.

18. The process of claim 13 wherein said 16-dehydro-20-ketopregnane is 3β-acetoxy-5,16-pregnadien-20-one, said di-substituted methylamine is isopropylamine, said amine is pyridine, and said lower alkanoic acid is acetic acid, the molar quantity of said acetic acid being about twice that of said 3β-acetoxy-5,16-pregnadien-20-one, said acetic acid and pyridine being about equimolar, said process comprising treating 3β-acetoxy-5,16-pregnadien-20-one with isopropylamine in the presence of light in the wave length range of from about 2,200 A to about 3,500 A, and treating the thereby formed 3β-acetoxy-16α-(1'-amino-1'-methylethyl)-5-pregnen-20-one with acetic acid and pyridine, the molar quantity of acetic acid being about twice that of said 3β-acetoxy-16α-(1'-amino-1'-methylethyl)-5-pregnen-20-one, the pyridine being about equimolar to the acetic acid, whereby is formed 3β-acetoxy-5-androsteno-2',5',5'-trimethyl-1'-pyrroline.

* * * * *

PO-1050
(5/69)

UNITED STATES PATENT OFFICE
CERTIFICATE OF CORRECTION

Patent No. 3,684,799      Dated August 15, 1972

Inventor(s) Thomas L. Popper

It is certified that error appears in the above-identified patent and that said Letters Patent are hereby corrected as shown below:

Column 1, lines 21 and 22, "3-keton-4-androsten" should read--3-keto-4-androsteno- --. Column 4, line 47, "2',5',5',1'-pyrroline" should read --2',5',5'-trimethyl-1'-pyrroline--; line 51, "[17α,16-c]" should read --[17α,16α-c]--. Column 5, line 51, "[17α,16-c]-2',5',5',1'-pyrroline)" should read --[17α,16α-c]-2',5',5'-trimethyl-1'-pyrroline)--. Column 6, line 49, "[17α,16-c]" should read --[17α,16α-c]--; lines 50 and 51, "2',5',5'>1/4-trimethyl-1'-pyrroline)." should read --2',5',5'-trimethyl-1'-pyrroline).--. Column 7, line 38, "[17α,16-c]" should read --[17α,16α-c]--. Column 8, line 6, "60°-100bL C]" should read --60-100°C).--; line 10, "organic solvent" should read --organic solution--. Column 9, line 48, "-2',5',5'1'-pyrroline" should read -- -2',5',5'-trimethyl-1'-pyrroline--. Column 10, lines 7 and 8 "-2',5',5'1'-pyrroline" should read --2',5',5'-trimethyl-1'-pyrroline--. Column 11, line 11, "hours a" should read --hours with a --; lines 35 and 36, "-2',5',5'>1/4-trimethyl-1'-pyrroline" should read --2',5',5'-trimethyl-1'-pyrroline--; lines 41 and 42 "2',5',5'1'-pyrroline" should read --2',5',5'-trimethyl-1'-pyrroline--; line 61, "-2',5',5'1'-pyrroline" should read --2',5',5'-trimethyl-1'-pyrroline--. Column 12, line 11, "-2',5',5'1'-pyrroline" should read -- -2',5',5'-trimethyl-1'-pyrroline--; lines 15 and 16 "-1',2',5'-tetramethyl" should read -- -1',2',5',5'-tetramethyl--; lines 26 and 27 "[17α,16α]" should read --[17α,16α-c]--; line 63, "acetate acid" should read --acetic acid--. Column 13, line 16, "[17α,16-c]-1',2',5'5'-benzyl-1'" should read --[17α,16α-c]-1',2',5'-trimethyl-5'-benzyl-1'--; lines 54 and 55 "[17α,16α]" should read --[17α,16α-c]--; lines 60 and 61 "[17α,16α]" should read --[17α,16α-c]--; lines 66 and 67 "[17α,16α]" should read --[17α,16α-c]--. Column 14, line 39, "iode" should read --iodide--. Column 15, lines 23 and 24 "[17α,16α]" should read --[17α,16α-c]--. Column 16, line 62 "(1-amino-" should read --(1'-amino- --. Column 17, line 7, "-2',5',5',1'-pyrroline" should read -- -2',5',5'-trimethyl-1'-pyrroline--.

PO-1050
(5/69)

UNITED STATES PATENT OFFICE
CERTIFICATE OF CORRECTION

Patent No. 3,684,799          Dated August 15, 1972

Inventor(s) Thomas L. Popper

It is certified that error appears in the above-identified patent and that said Letters Patent are hereby corrected as shown below:

Column 18, Claim 3, line 8 after the formula, "and" should read -- , --. Column 18, Claim 4, line 22, "$[17\alpha,16\text{-}\underline{c}]$-2',5',5' 1'-pyrroline" should read --$[17\alpha,16\alpha\text{-}\underline{c}]$-2',5',5'-trimethyl-1'-pyrroline. Column 18, Claim 5, line 32, "$[17\alpha,16\text{-}\underline{c}]$" should read --$[17\alpha,16\alpha\text{-}\underline{c}]$. Column 19, Claim 8, line 2, "-4-pregnen" should read -- -5-pregnen --. Column 20, Claim 17, line 63, "keptopregnane" should read -- ketopregnane--.

Signed and sealed this 22nd day of May 1973.

(SEAL)
Attest:

EDWARD M. FLETCHER, JR.          ROBERT GOTTSCHALK
Attesting Officer          Commissioner of Patents